United States Patent [19]
Hara

[11] Patent Number: 5,313,472
[45] Date of Patent: May 17, 1994

[54] BIT DETECTING METHOD AND APPARATUS

[75] Inventor: Masaaki Hara, Kanagawa, Japan

[73] Assignee: Sony Corporation, Tokyo, Japan

[21] Appl. No.: 894,340

[22] Filed: Jun. 4, 1992

[30] Foreign Application Priority Data

Jun. 14, 1991 [JP] Japan .................. 3-170489
Oct. 16, 1991 [JP] Japan .................. 3-296389

[51] Int. Cl.$^5$ .............................. G06F 11/00
[52] U.S. Cl. .............................. 371/31; 371/6
[58] Field of Search .................. 360/46; 371/6, 31

[56] References Cited

U.S. PATENT DOCUMENTS

| | | | |
|---|---|---|---|
| 3,611,149 | 10/1971 | Kimball | 375/101 |
| 4,054,863 | 10/1977 | Goodman et al. | 371/31 |
| 4,497,055 | 1/1985 | Hoshino et al. | 371/31 |
| 4,639,920 | 1/1987 | Kaneko | 371/31 |
| 4,763,293 | 8/1988 | Takei et al. | 371/31 |
| 4,803,684 | 2/1989 | Kozuki et al. | 371/31 |
| 4,825,440 | 4/1989 | Heitmann et al. | 371/31 |
| 4,829,522 | 5/1989 | Nishiguchi | 371/31 |
| 4,829,553 | 5/1989 | Bretl | 371/31 |
| 4,907,277 | 3/1990 | Callen et al. | 371/31 |

FOREIGN PATENT DOCUMENTS 0180971 5/1986 European Pat. Off. .
0369518 5/1990 European Pat. Off. .
2639494 5/1990 France .

OTHER PUBLICATIONS

IEEE Transactions on Consumer Electronics vol. 35, No. 3, Aug. 1989, New York pp. 520–526 Shinetsu Kato et al. 'An adaptive equalizer for r-dat' p. 521, right column, last paragraph-p. 523, paragraph 2.

Primary Examiner—Charles E. Atkinson
Attorney, Agent, or Firm—William S. Frommer; Alvin Sinderbrand

[57] ABSTRACT

A bit detecting process for identifying binary bit values of digitized signals whose bit amplitudes may be distorted. A digital signal which represents the amplitude of a bit at discrete clock intervals is generated and the difference between a threshold value and the value of the digital signal is determined. A first integral method algorithm or a second second-order difference method algorithm, each of which identifies the binary value of the bit, is selected as a function of the determined difference.

10 Claims, 12 Drawing Sheets

ENVELOPES

AMPLITUDE DISTRIBUTION

ERROR DISTRIBUTION

Fig. 2D

ERRORS
10

5

40  60

ERROR RATE
(× 10⁻⁴)

1.0

0.5

SECOND-ORDER DIFFERENCE
THRESHOLD VALUE : S, D

Fig. 2E

ERRORS
10

5

0.5  1.0

ERROR RATE
(× 10⁻⁴)

1.0

0.5

THRESHOLD VALUE
CORRECTIVE COEFFICIENT : C

WAVEFORM OF THE REPRODUCED SIGNAL

CHANGES IN THE THRESHOLD VALUE

REPRODUCED SIGNAL AND THRESHOLD VALUE

WAVEFORM OF THE REPRODUCED SIGNAL

CHANGES IN THE THRESHOLD VALUE

REPRODUCED SIGNAL AND THRESHOLD VALUE

WAVEFORM OF THE REPRODUCED SIGNAL

CHANGES IN THE THRESHLOLD VALUE

REPRODUCED SIGNAL AND THRESHOLD VALUE

BIT DETECTING METHOD AND APPARATUS

BACKGROUND OF THE INVENTION

1. Field of the Invention

This invention relates to an apparatus for processing a reproduced signal in a digital recording/reproducing system or transfer system using a magnetic recording medium and, in particular, to bit identification for converting a reproduced signal into a binary signal.

2. Description of the Prior Art

In a digital recording/reproducing system or a digital transfer system, an increase in recording density invites a decrease in S/N ratio of a signal reproduced from a magnetic recording medium (magnetic tape, magnetic disk and so on), and increases such errors so that the reproduced digital signal does not correspond to the recorded digital signal. There is a need for a signal processing technique that properly detects a digital signal from an analog waveform from a reproducing head.

A known existing signal processing technique available for this purpose is an integral detecting method. This method executes equalization based on an equalizing standard, called the Nyquist standard, to minimize intersymbol interference at an identified point and then binarizes the Nyquist waveform, in view of the value relative to a predetermined threshold value.

However, it is difficult to realize an equalizer fully satisfying the equalizing standard, and the existing method has a problem that errors concentrate around the threshold value because of random noise, low range shutoff, and high range shortage, and so on, with respect to the reproduced signal.

Digital signal reproducing apparatuses using integral detection have heretofore required an automatic equalizer having a simple construction and capable of compensating variations and changes with time in characteristics of tape or heads. If a transversal filter is used, an automatic equalizing algorithm can be used, and such an equalizer can be realized. However, sufficient equalization is not possible with a small number of taps. If the number of taps is increased, a resultant circuit is large-scaled. Therefore, no automatic equalizer has been available for practical use.

OBJECTS AND SUMMARY OF THE INVENTION

It is therefore an Object of the present invention to provide a reproduced signal processing apparatus improved to decrease the error rate as compared to the existing integral detection method.

Another object of the invention is to provide a reproduced signal processing apparatus permitting automatic adjustment of parameters.

In order to attain the above-indicated object, a bit detecting process according to the invention for identifying the value of a bit on the basis of the amplitude of each bit of an input signal which is a target of bit detection is characterized in that, on the basis of the value of data on a bit amplitude obtained by quantizing said input signal, the data on the bit amplitude is binarized by the optimal selection of either a bit identifying process using an integral method or a bit identifying process using a second-order difference method.

In addition, this invention provides a system for processing a signal reproduced from a magnetic recording medium, which equalizes the signal reproduced from the magnetic recording medium by an electromagnetic converter by using the Nyquist standard, compares the reproduced signal after equalization with a threshold value, and converts the reproduced signal into a binary signal, comprising:

an A/D-converter for A/D-converting the reproduced signal after equalization at a data rate;

a circuit for obtaining a second-order difference value by using a target bit and its preceding and subsequent bits of an output signal from the A/D converter;

a circuit for obtaining an identifying value of the preceding bit;

a circuit for obtaining an identifying value of the subsequent bit; and a circuit for generating one of the sum or the difference of a second-order difference threshold value and the second-order difference value in response to the identifying value of the preceding bit, multiplying the selected sum or difference by a threshold value corrective coefficient, and adding a resultant value to a predetermined threshold value.

The invention also detects consistency of the identifying values of the preceding and subsequent bits and uses different second-order difference threshold values and threshold value corrective coefficients between consistency and inconsistency of the identifying values.

The invention also fixes the threshold value corrective coefficient and automatically adjusts first and second second-order difference threshold values to optimum values. That is, the invention provides a system for processing a signal reproduced from a magnetic recording medium, which equalizes the signal reproduced from the magnetic recording medium by an electromagnetic converter by using the Nyquist standard, compares the reproduced signal after equalization with a threshold value, and converts the reproduced signal into a binary signal, comprising:

a detector circuit including a circuit for A/D-converting the reproduced signal after equalization at a data rate; a circuit for obtaining a difference between the value of a target bit from the A/D converter and a value obtained by multiplying a fixed coefficient by a second-order difference value obtained by using said target bit and its preceding and subsequent bits; a circuit for detecting a difference between the difference and a predetermined threshold value; a circuit for obtaining an identifying value of the preceding bit; a circuit for obtaining an identifying value of said subsequent bit; a circuit for detecting consistency of the identifying values of the preceding and subsequent bits; and a circuit responsive to the identifying value of the preceding bit for executing addition or subtraction of one of first or second second-order difference threshold value selected in response to a result of the detection and for generating an identification output;

circuits coupled to the detector circuit for detecting an equalization error of the identification value corresponding to the target bit from the detector circuit;

parameter adjuster circuits for successively varying virtual gains, the first and the second second-order threshold values in a direction for reducing said equalization error, the virtual gain being introduced to regard comparative processing executed on the target bit by the detector circuit to be a transversal filter; and a feedback circuit for giving the virtual gains from the parameter adjuster circuits to the equalization error detector circuits and giving the first and second second-order threshold values to the detector circuit.

In the arrangement indicated above, by binarizing the data on the bit amplitude by using the optimal selection of either the bit identifying process using the integral method or the bit identifying process using the second-order difference method in accordance with the value of the data on the bit amplitude obtained by quantization of the input signal, bit detection errors are largely reduced even with random noise, low range shutoff, high range shortage, bit shift, and so on, which prevents noise enhancement or error transfer, and significantly simplifies the circuit arrangement including the A/D converter, and facilitates adjustment.

This invention can reduce errors after identification by moving threshold values in a direction decreasing affection by low range cutoff, high range shortage or bit shift. Since the identifying value of the subsequent bit is obtained by using a predetermined threshold value for integral detection before an adaptive threshold value is obtained, it is a provisional identifying value.

The invention can also adjust automatically parameters for obtaining an adaptive threshold value without using a test signal.

The above, and other, objects, features and advantage of the present invention will become readily apparent from the following detailed description thereof which is to be read in connection with the accompanying drawings.

BRIEF DESCRIPTION OF THE DRAWINGS

FIGS. 2A–2E presents schematic views of changes in parameters and the number of errors in one embodiment of the invention;

DETAILED DESCRIPTION OF THE PREFERRED EMBODIMENTS

Figure 1A:
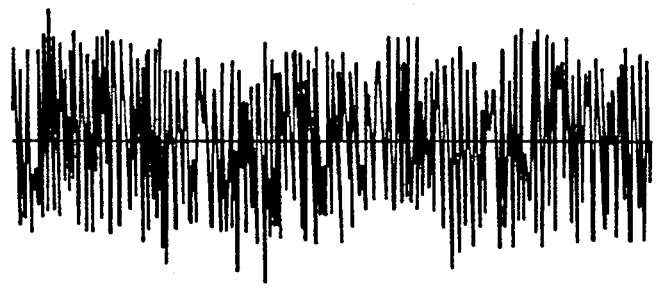
FIGS. 1A–1C presents schematic views of a reproduced signal and errors identified by an existing method.

This invention remarks the fact that a portion, in which errors occur because of random noise, low range shutoff, high range shortage and so on, can be presumed. The invention adaptively controls a threshold value of an integral detecting method, and executes the following general processing.

1) A reproduced signal after equalization (Nyquist waveform) is A/D-converted at a data rate, and a second-order difference value (ddX) is obtained by using a target bit and its preceding and subsequent bits. Further, identifying values of the preceding and subsequent bits $(A(k-1), A'(k+1))$ are obtained.

2) When the identifying values of the preceding and subsequent bits are consistent, either the sum or difference between a first second-order threshold value (S) and the second-order difference value (ddX) is selected in response to the identifying value. The selected difference or sum is multiplied by a first threshold value corrective coefficient (Cs), and then added to the threshold value for integral detection (T).

3) When the identifying values of the preceding and subsequent bits are inconsistent, either the difference or the sum of a second second-order difference threshold value (D) and the second-order difference value (ddX) is selected in response to the identifying value of the preceding bit. The selected difference or sum is multiplied by a second threshold value corrective coefficient (Cd), and then added to the predetermined threshold value (T).

As a result, the threshold value can be moved in a direction decreasing affection by low range shutoff, high range shortage or bit shift, and errors after identification can be reduced. Since the identifying value of the subsequent bit $A'(k+1)$ is obtained by using the threshold value for integral detection before an adaptive threshold value is obtained, it is a provisional identifying value.

The adaptive threshold value detecting method detects an adaptive threshold value by varying the threshold value as follows:

When $A(k-1) = A'(k+1)$:
$X(k) \geq T + Cs \times (ddX - A(k-1) \times S)$: $A(k) = 1$
$X(k) < T + Cs \times (ddX - A(k-1) \times S)$: $A(k) = -1$.
When $A(k-1) \neq A'(k+1)$:
$X(k) \geq T + Cd \times (ddX - A(k-1) \times D)$: $A(k) = 1$
$X(k) < T + Cd \times (ddX - A(k-1) \times D)$: $A(k) = -1$.

where $X(k)$: amplitude of the reproduced signal of the kth bit after equalization;

$A(k)$: identifying value of the kth bit (1 or $-1$);

$A'(k)$: provisional identifying value of the kth bit (1 or $-1$);

T: predetermined threshold value for integral detection;

S: second-order difference threshold value when preceding and subsequent bits are equal;

D: second-order difference threshold value when preceding and subsequent bits are different;

Cs: threshold value corrective coefficient when preceding and subsequent bits are equal;

Cd: threshold value corrective coefficient when preceding and subsequent bits are different;

ddX: second-order difference in bit intervals.

The second-order difference ddX is necessary for distinction between low range shutoff and high range shortage, and defined by:

$$ddX = X(k-1) - 2 \times X(k) + X(k+1).$$

In the adaptive threshold value detecting method, also when (Xth=S=D, C=Cs=Cd), errors are reduced. In this case, the foregoing expressions results in:

When A(k − 1) = 1:
  X(k) ≧ T + C × (ddX − Xth): A(k) = 1
  X(k) < T + C × (ddX + Xth): A(k) = −1.
When A(k − 1) = −1:
  X(k) ≧ T + C × (ddX + Xth): A(k) = 1
  X(k) < T + C × (ddX + Xth): A(k) = −1.

Figure 1B:
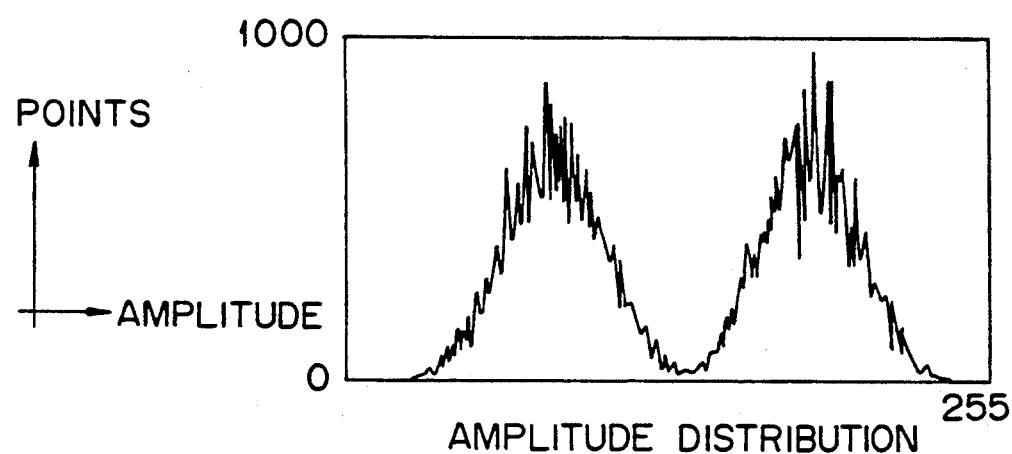
Figure 1C:
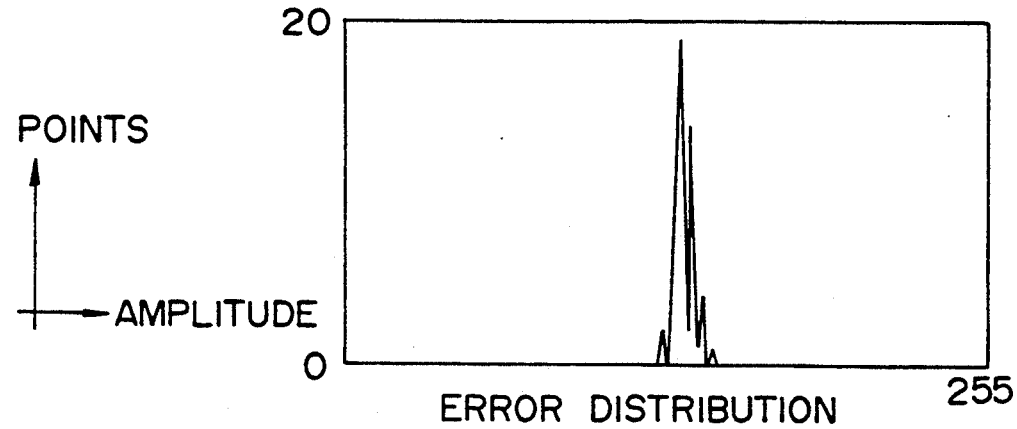

FIG. 1C shows error distribution as a result of bit identification of a reproduced signal after equalization having the waveform shown in FIG. 1A by using the existing integral detecting method. FIG. 1B shows amplitude distribution. FIG. 1A shows the waveform after equalization of a digital signal of 30 Mbps used as a test signal. The total number of samples in FIG. 1B is 262,145. FIG. 1C shows a result of bit identification by setting the threshold value for integral detection to T=133, and the number of errors is 92. Therefore, the error rate is $1.5 \times 10^{-3}$.

Figure 2A:
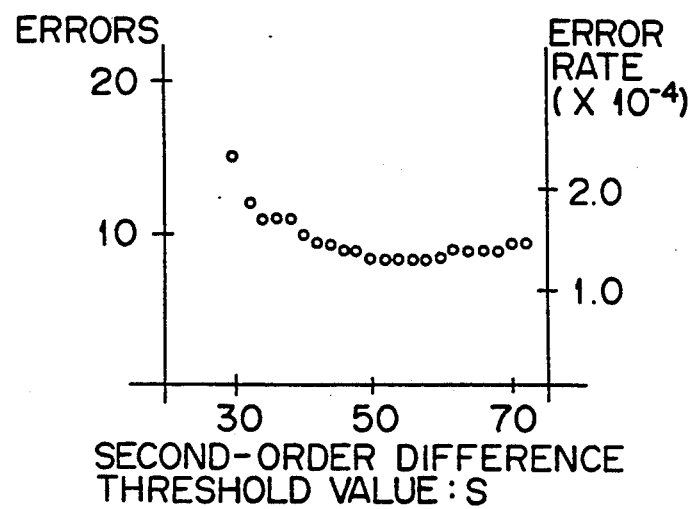
Figure 2B:
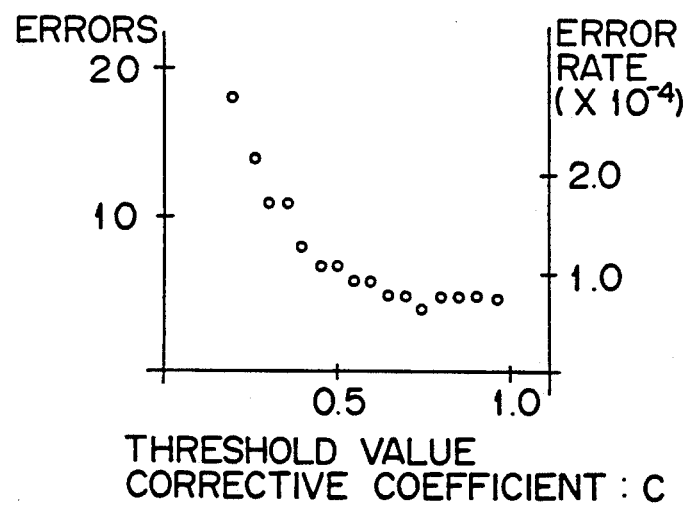
Figure 2C:
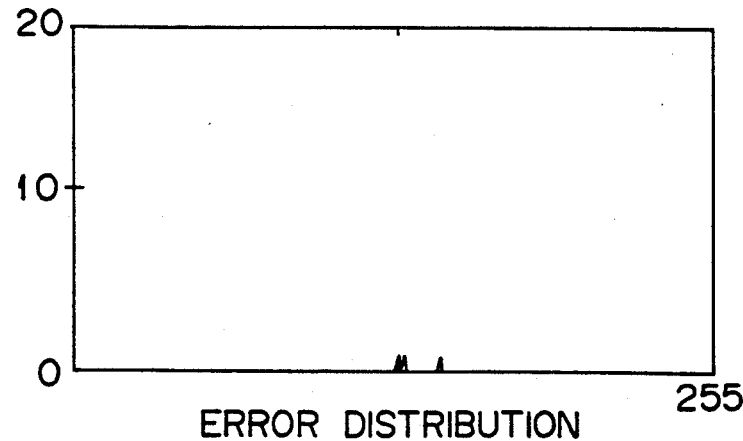

In the foregoing adaptive threshold value method, the parameters S and C are varied under D=0 and C=Cs=Cd. Then errors are distributed as shown in FIGS. 2A and 2B, respectively. FIG. 2A shows changes in number of errors with changes in the second-order threshold value S under T=133 and C=0.5. FIG. 2B shows changes in number of errors with changes in the threshold value corrective coefficient C under T=133 and S=54. When values are set at T=133, S=54 and C=0.75, error distribution is as shown in FIG. 2C where the number of errors is reduced from 92 to 3. That is, errors are reduced to 1/30, approximately.

It was known by investigating these three residual errors that preceding and subsequent bits had been different in all cases. Then, it was confirmed that the use of the second-order threshold value is preferable (D≠0). Error distributions by a method using S and D (for example, S=D) to the reproduced signal of FIG. 1A are shown in FIGS. 2D and 2E. FIG. 2D shows changes in number of errors with changes in the second-order difference threshold values S and D under T=133 and C=0.5. FIG. 2E shows changes in number of errors with changes in the threshold value corrective coefficient C under T=133 and S=54. It is known from FIG. 2E that optimization of parameters can reduce errors to zero.

Figure 3A:
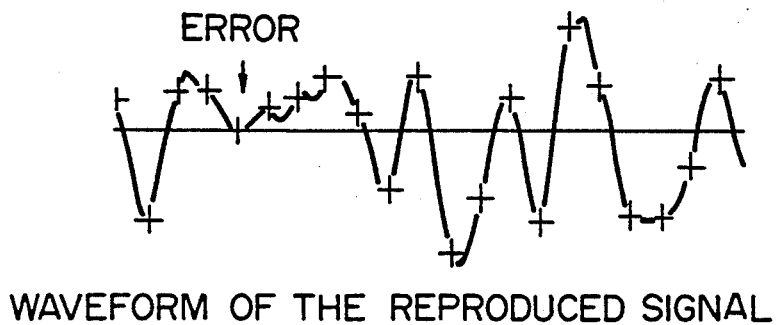
FIGS. 3A–3C presents waveform diagram showing control of a threshold value in one embodiment of the invention.
Figure 3B:
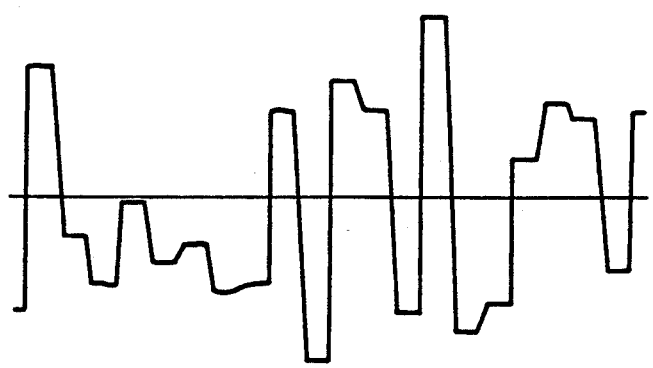
Figure 3C:
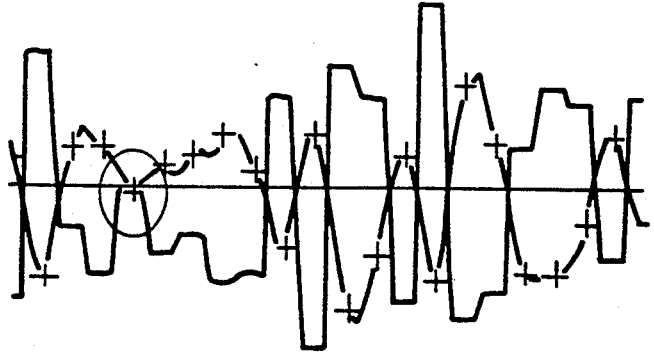
Figure 4A:
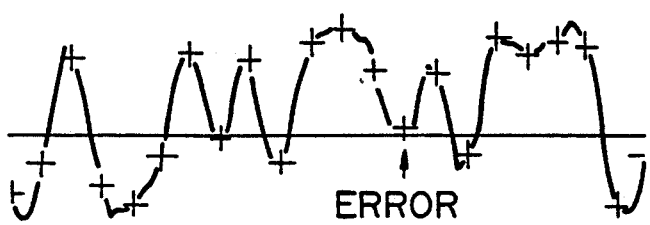
FIGS. 4A–4C presents waveform diagrams showing control of a threshold value in one embodiment of the invention.
Figure 4B:
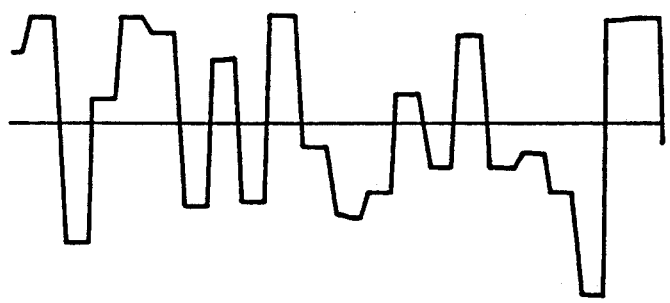
Figure 4C:
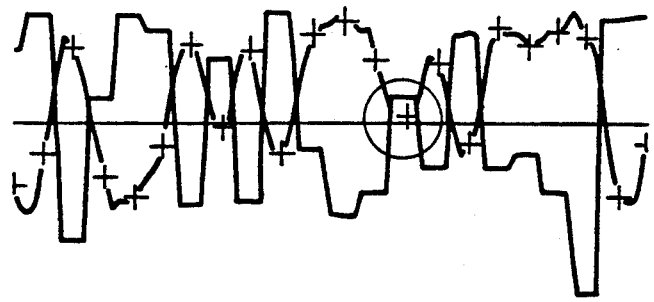
Figure 5A:
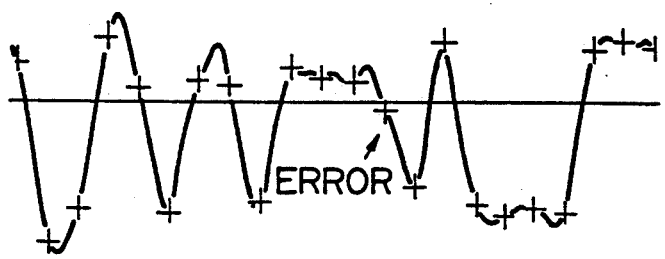
FIGS. 5A–5C presents waveform diagrams showing control of a threshold value in one embodiment of the invention.

FIGS. 3, 4 and 5 show examples of bit identification by the adaptive threshold value detecting method under the conditions of S=D and C=Cs=Cd. FIG. 3A shows the waveform of the reproduced signal upon low range shutoff, FIG. 4A the waveform of the reproduced signal upon high range shortage, and FIG. 5A the waveform of the reproduced signal upon occurrence of bit shift. All these waveforms are those after Nyquist equalization. In these drawings, errors may occur at a portion shown by an arrow because of the relationship between the threshold value for integral detection and the reproduced signal level.

Figure 5B:
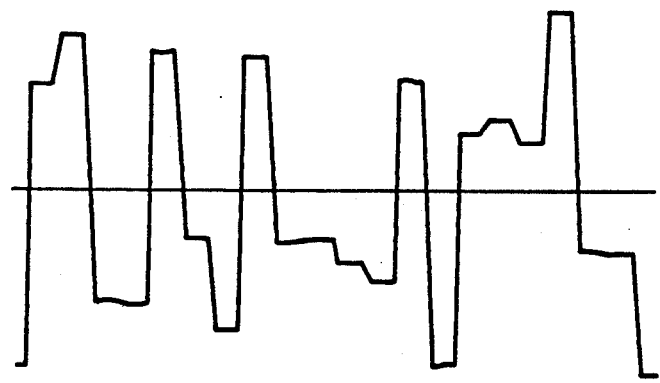
Figure 5C:
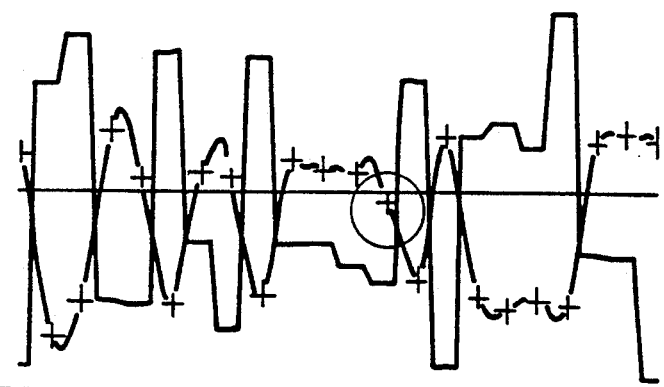

According to the adaptive threshold value detecting method to which the invention is applied, the threshold value for bit identification varies with respective waveforms of the reproduced signal as shown in FIGS. 3B, 4B and 5B. FIGS. 3C, 4C and 5C each show an aspect in which the reproduced signal and the threshold value in overlapping forms. It is known from these drawings that proper bit identification is possible regardless of distortion of the waveform of the reproduced signal.

The adaptive threshold value detecting method described above may be realized by using simple hardware including an A/D converter, a shift register, a circuit for detecting the second-order difference, a circuit for multiplying it by the corrective coefficient C, an adder or subtractor responsive to the identifying value of the preceding bit for increasing or decreasing the threshold value T, and so on.

The adaptive threshold value detecting method can reduce errors to 1/10 or less as compared to the existing integral detecting method. However, it is necessary to adjust four parameters (S, D, Cs and Cd) to respective optimum values by using a test signal. Another embodiment of the invention described below attains automatic adjustment of the parameters.

Figure 6:
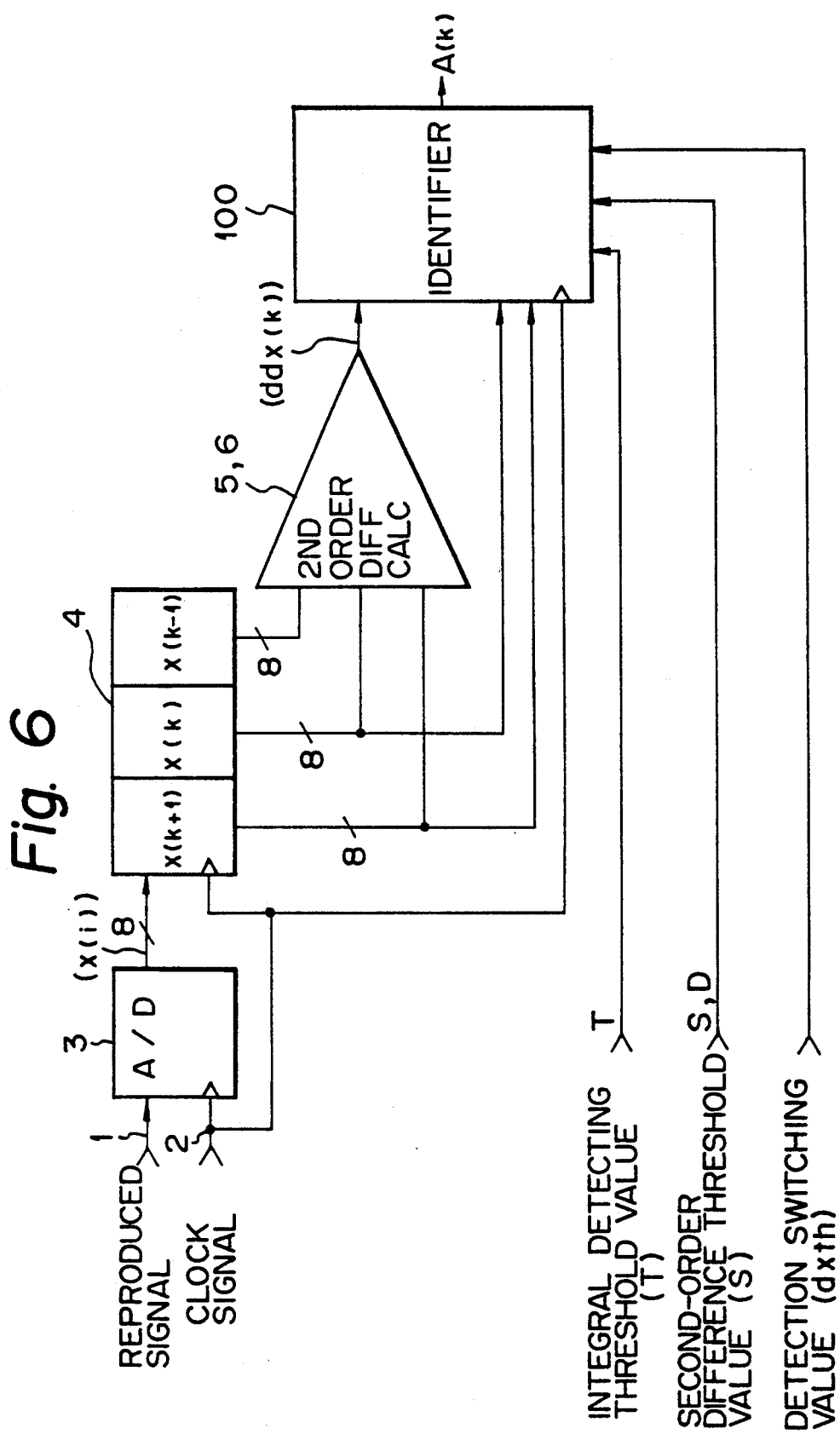
FIG. 6 presents a circuit diagram showing a bit detecting circuit to which a bit detecting process fundamental principle of the invention is applied.

FIG. 6 is a circuit diagram showing a bit detecting circuit to which a bit detecting process principle of the invention is applied.

The bit detecting circuit shown in FIG. 6 includes an A/D converter 3, a shift register 4, a second-order difference calculator (5, 6), and an identifier 100. Every time when a clock signal is input, the bit detecting circuit quantizes a reproduced signal and, on the basis of the value of bit amplitude data X(k-1) obtained by the quantization, binarizes the bit amplitude data X(k-1) by selectively using the optimal selection of either a bit identifying process using an integral method or a bit identifying process using a second-order difference method.

Every time when the clock signal in intervals corresponding to a data rate is supplied, the A/D converter 3 takes the reproduced signal, generates bit amplitude data X(1) in 8 bits by A/D-converting (converting from analog to digital form) the reproduced signal, and supplies the bit amplitude data X(1) to the shift register 4.

Every time when the clock signal is supplied, the shift register 4 takes and shifts the bit amplitude data X(1) output from the A/D converter 3, and gives to the second-order difference calculator 5, 6 current bit amplitude data X(k+1) obtained by the shifting process, first preceding bit amplitude data X(k) and second preceding amplitude data X(k−1). The shift register 2 also gives the current amplitude data X(k+1) and the first preceding bit amplitude data X(k) to the identifier 100.

The second-order difference calculator (5, 6) computes a second-order difference value ddX(k) by performing computation shown by the following formula on the basis of the current bit amplitude data X(k+1), the first preceding bit amplitude data X(k) and the next-to-first preceding bit amplitude data X(k−1), and gives the second-order difference value ddX(k) to the identifier 100:

$$\begin{aligned}ddX(k) &= dX(k) - dX(k-1) \\ &= X(k+1) - 2X(k) + X(k-1).\end{aligned} \quad (1)$$

Every time when the clock signal is applied, the identifier 100 performs identifying process described below by using an integral threshold value T and a second-order difference threshold value S,D, a detection switching value dXth, all output from different circuits (not shown), the current bit amplitude data X(k+1), the first preceding bit amplitude data X(k), both output from the shift register 4, and the second-order difference value ddX(k) output from the second-order difference calculator 3, to determine whether the first preceding bit amplitude data X(k) to be detected is "1" or "0", and outputs the determination.

First, the identifier 100 determines which of the following formulas be satisfied:

$$ABS(X(k)-T) > dXth \tag{2}$$

$$ABS(X(k)-T) \leq dXth \tag{3}$$

where ABS( ): code for indicating the absolute value of the value in ( ).

If the formula (2) is satisfied, the identifier 100 determines that the value of the first preceding bit amplitude data X(k) is largely different from the integral threshold value Xth and bit identification using the integral detecting method does not invite bit detection error, and obtains and outputs an identifying value A(k) in accordance with the following formulas:

$$X(k) \geq T \rightarrow A(k) = 1 \tag{4}$$

$$X(k) < T \rightarrow A(k) = 0 \tag{5}$$

When the formula (3) is satisfied, the identifier 100 determines that the value of the first preceding bit amplitude data X(k) lies at the portion of the integral threshold value X and the bit identification using the integral detecting method will invite a bit detection error, and selects the bit identifying process using the second-order difference method in lieu of the bit identifying process using the integral detecting method to determine which of the following formulas is satisfied:

$$A(k-1) = A(k+1) \tag{6}$$

$$A(k-1) \neq A(k+1) \tag{7}$$

If the formula (6) is satisfied, the identifier 100 uses an identifying value A(k−1) for the second preceding bit amplitude data X(k−1) and obtains and outputs an identifying value A(k) for the bit amplitude data X(k) to be then identified in accordance with the following formulas:

$$ABS(ddX(k)) \geq S(D) \rightarrow A(k) \neq A(k-1) \tag{8}$$

$$ABS(ddX(k)) < S(D) \rightarrow A(k) = A(k-1) \tag{9}$$

If the formula (7) is satisfied, the identifier 100 obtains and outputs the identifying value A(k) for the bit amplitude data X(k) to be then identified in accordance with the following formulas:

$$ddX(k) \geq 0 \rightarrow A(k) = 0 \tag{10}$$

$$ddX(k) < 0 \rightarrow A(k) = 1. \tag{11}$$

Hereafter, the identifier 100 performs the above-described identifying process every time when the clock signal is applied to determine whether the bit amplitude data X(k) to be detected is "1" or "0", and decides and outputs the value of the identifying value A(k).

This embodiment performs processing outlined below.

1) It regards operation of the adaptive threshold value detecting method to be a transversal filter.

2) It previously fixes the threshold value corrective coefficient by which the second-order difference of a bit interval has been multiplied before addition to the threshold value for integral detection.

3) It introduces virtual gains in order to adapt automatic equalizing algorithm of the transversal filter.

4) It calculates, at an adequate timing, an error estimating function required for automatic equalizing algorithm.

5) It renews the second-order threshold value in accordance with an index obtained from similarity between the transversal filter and the adaptive threshold value detecting method.

As a result, a bit identifier is realized, which permits an automatic adjustment of parameters without using a test signal, reduces the sign error rate to 1/10, approximately, as compared to the integral detecting method, and compensates varieties and changes with time of devices and media.

The equation used for detection by the foregoing adaptive threshold value detecting method, when deformed, may be regarded as a kind of transversal filter. The portion irrelevant to the identifying values of the preceding and subsequent bits behaves as a transversal filter as follows:

$$\begin{aligned} Y(k) &= X(k) - C \times ddX \\ &= (1 + 2 \times C) \times X(k) - C \times \\ & \quad X(k-1) - C \times X(k+1). \end{aligned}$$

Here the threshold value corrective coefficient C is fixed to C=0.4 to 0.6 under the condition of C=Cs =Cd regardless of the input signal. Even by optimizing the second-order difference values S and D alone while fixing the value of the corrective coefficient C, the effect of reducing the sign error rate does not vary largely. For example, in order to reduce the number of parameters, the value of C may be fixed to C=0.5. Then the portion irrelevant to the identifying values of the preceding and subsequent bits behaves as a transversal filter having the following fixed coefficient:

$$Y(k) = 2 \times X(k) - X(k-1)/2 - X(k+1)/2.$$

When introducing Gs and Gd as virtual gains and adding treatment of S and D, a nonlinear transversal filter having the following form is obtained, in which it is sufficient to identify 1 or −1 of a bit in view of the sign of Zs or Zd:

When $A(k-1) = A(k+1)$:
$Zs(k) = Gs \times (Y(k) - T - A(k-1) \times S/2)$.
When $A(k-1) \neq A(k+1)$:
$Zd(k) = Gd \times (Y(k) - T - A(k-1) \times D/2)$.

Discussed below is employment of automatic equalizing algorithm to the nonlinear transversal filter. Representative examples of automatic equalizing algorithm are a zero-forcing method and a method of least squares. The following discussion is directed to an arrangement in which a zero-forcing method, which is relatively simple, is used for automatic equalization by a three-tap transversal filter.

An output of the three-tap transversal filter is expressed by the following equation:

$$X(k) = C(-1) \times Y(k-1) + C(0) \times Y(k) + C(1) \times Y(k+1).$$

where
- $Y(k)$: amplitude of a reproduced signal of a kth bit before equalization;
- $X(k)$: amplitude of the reproduced signal of the kth bit after equalization;
- $C(0)$: coefficient for a current bit (target bit);
- $C(-1)$: coefficient for a preceding bit; and
- $C(1)$: coefficient for a subsequent bit.

An equalization error and its estimated value are obtained for automatic equalization. A signal $E(k)$ corresponding to the equalization error is defined by the following equation:

$$E(k) = (X(k) - T) - B(k).$$

where
- $E(k)$: equalization error of the kth bit;
- $B(k)$: expected amplitude value obtained from a result of detection of the kth bit; and
- $T$: threshold value for integral detection.

Estimated value $H(j)$ of the equalization error is defined by the following equation:

$$H(j) = \Sigma A(k-j) \times sgn(E(k)).$$

where
- $\Sigma$: sum of $(k=0)$ to $(k=N)$;
- $A(k)$: result of identification of the kth bit (1 or $-1$);
- $\alpha \geq 0$: $sgn(\alpha) = 1$; and
- $\alpha \geq 0$: $sgn(\alpha) = -1$.

An appropriate occurrences $N$ of addition for obtaining the estimated value $H(j)$ depends from the S/N of the reproduced signal.

The three-tap transversal filter increases or decreases the coefficient of the filter by a microvalue in view of signs of three estimated values in a direction for reducing the intersymbol interference. That is, the filter coefficient resulting from the automatic equalization is defined by:

$$C(-1) = C(-1) - \Delta \times sgn(H(-1))$$

$$C(0) = C(0) - \Delta \times sgn(H(0))$$

$$C(1) = C(1) - \times sgn(H(1)).$$

This is the automatic equalizing procedure by the three-tap transversal filter using the zero-forcing method.

Next explanation is directed to the use of this method to the foregoing adaptive threshold value detecting method. It is known by using the expressions of $Zs(k)$ and $Zd(k)$ that the signal $E(k)$ corresponding to the equalization error and the estimated value $H(j)$ of the equalization error are given by the same equations as those for the transversal filter. Note, however, that separate consideration is required between consistency and inconsistency of the preceding and subsequent bits.

When $A(k-1) = A(k+1)$:
$$Es(k) = Zs(k) - B(k)$$

$$Hs(j) = \Sigma A(k-j) \times sgn(Es(k)).$$

When $A(k-1) \neq A(k+1)$:
$$Ed(k) = Zd(k) - B(k)$$
$$Hd(j) = \Sigma A(k-j) \times sgn(Ed(k)).$$

Estimated values are $Hs(-1)$, $Hs(0)$, $Hs(1)$, $Hd(-1)$, $Hd(0)$ and $Hd(1)$. In almost all the cases, $$Hs(-1) = Hs(1)$$

$$Hd(-1) = Hd(1).$$

In addition, since the identifying value $A(k-1)$ is more reliable than the identifying value $A'(k+1)$ provisionally identified by normal integral detection, it is sufficient to consider only four values, $Hs(0)$, $Hd(0)$, $Hs(-1)$ and $Hd(-1)$, as estimated values of equalization error. How to increase or decrease the parameters in view of respective signs may be determined as follows:

Since gains $Gs$ and $Gd$ may be regarded as a substitute for $C(0)$ of the transversal filter, they may be expressed by:

$$Gs = Gs - \Delta g \times sgn(Hs(0))$$

$$Gd = Gd - \Delta g \times sgn(Hd(0)).$$

An increase of the second-order threshold values $S$ and $D$ corresponds to enhancement of low ranges, and a decrease thereof corresponds to enhancement of high ranges. In a transversal filter, enhancement of low ranges increases $C(-1)$ and $C(1)$ simultaneously, and enhancement of high ranges decreases $C(-1)$ and $C(1)$ simultaneously. Therefore, if an increase of $C(-1)$ and $C(1)$ is desired, $S$ and $D$ may be increased. If a decrease is desired, $S$ and $D$ may be decreased. In conclusion, the parameters may be renewed under the following conditions:

$$S = S - \Delta t \times sgn(Hs(-1))$$

$$D = D - \Delta t \times sgn(Hd(-1)).$$

$Gs$ and $S$ are independent from $Gd$ and $D$, and can be adjusted absolutely independently.

As an application of this invention, the tap gain of a three-tap linear canceler can be set automatically in absolutely the same manner. An output of the three-tap linear canceler is defined by:

$$LC(k) = X(k) + C(-1) \times A'(k-1) + C(1) \times A'(k+1).$$

These two tap gains $C(-1)$ and $C(1)$ have the following relationships with $S$ and $D$ indicated above:

$$C(-1) = (S+D)/4$$

$$C(1) = (S+D)/4.$$

By using the relationships and introducing the virtual gains $Gs$ and $Gd$, the same nonlinear transversal filter as that by the foregoing adaptive threshold value detecting method is obtained.

When $A(k-1) = A(k+1)$:
$$Zs(k) = Gs \times (X(k) - T - A(k-1) \times S/2).$$
When $A(k-1) \neq A(k+1)$:

-continued $$Zd(k) = Gd \times (X(k) - T - A(k - 1) \times D/2).$$

Therefore, by setting $C(-1)$ and $C(1)$ by using the above equations, with Gs, Gd, S and D to be renewed at an appropriate timing, the tap gain of the three-tap linear canceler can be set automatically.

Figure 7:
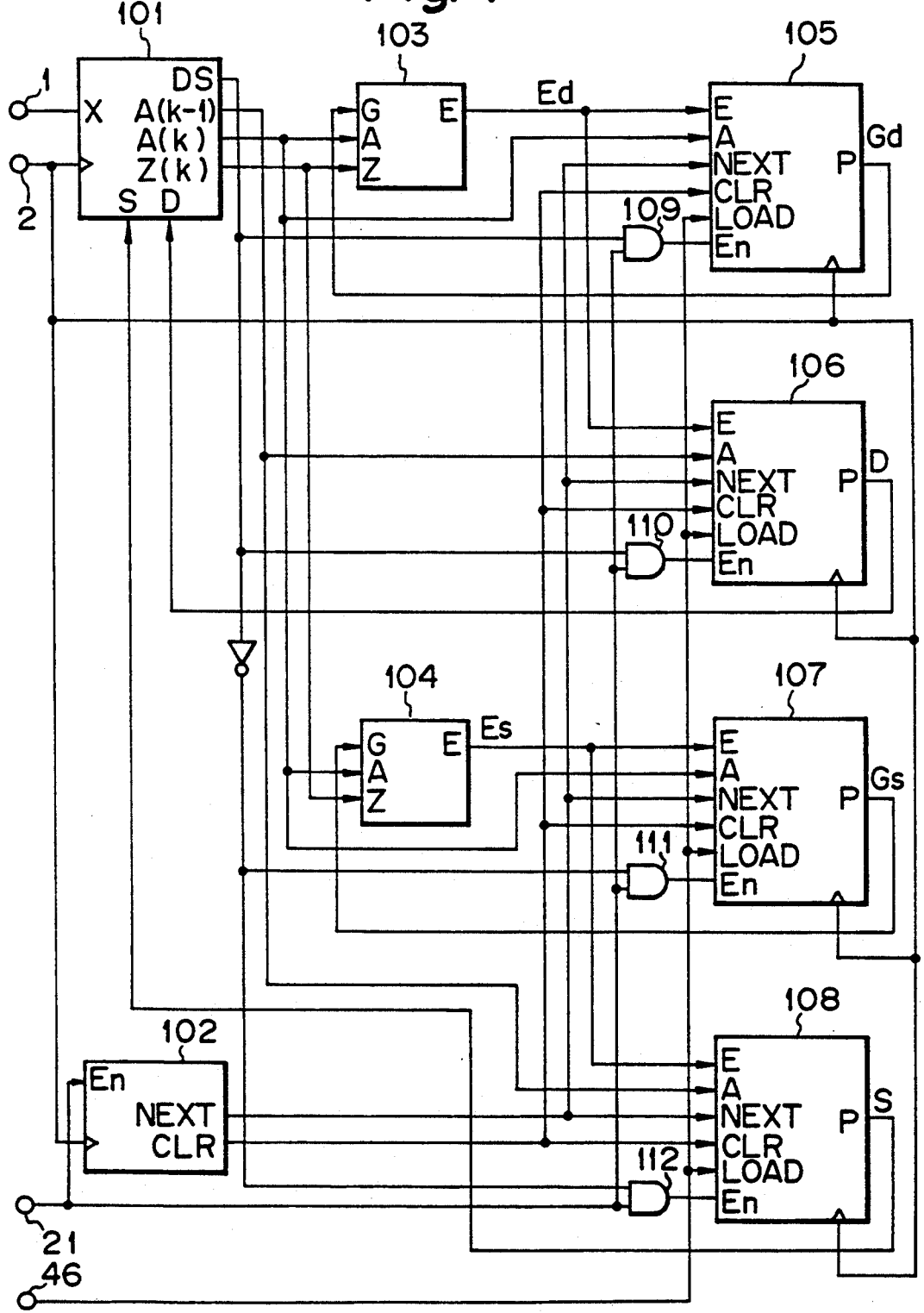
FIG. 7 is a block diagram of the entirety of a further embodiment of the invention.

FIG. 7 shows a circuit arrangement for realizing automatic setting of parameters by the further embodiment described above. The circuit arrangement of FIG. 7 includes a detecting circuit 101 using the adaptive threshold value detecting method, a parameter modifying/controlling circuit 102, equalization error calculating circuits 103, 104, and parameter setting circuits 105, 106, 107 and 108.

The detecting circuit 101 is fed with a reproduced signal reproduced by a reproducing head (not shown) and given through a reproduction amplifier and a reproduction equalizer, and a clock CLK at a data rate of the reproduced signal. The clock CLK may be reproduced by PLL (not shown). The detecting circuit 101 is a bit identifier using the adaptive threshold value detecting method as shown in FIG. 8.

Figure 8:
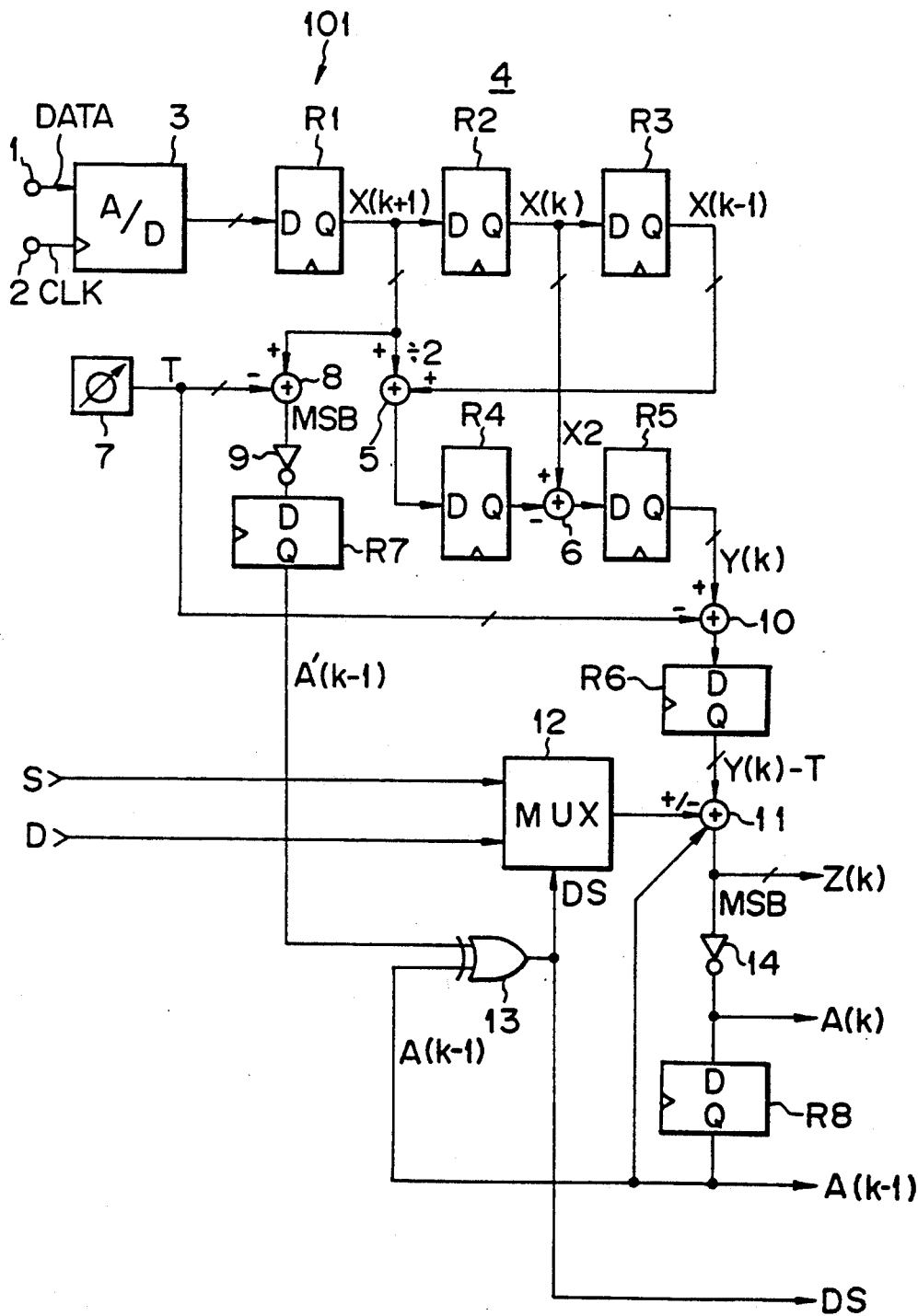
FIG. 8 is a block diagram of a detecting circuit in the further embodiment of the invention, which uses an adaptive threshold value detecting method.

Referring to FIG. 8, the reproduced signal and the clock are fed to an A/D converter 3. An output signal from the A/D converter 3 is fed to a shift register 4 including registers R1, R2 and R3. The respective registers sequentially store successive three samples (one sample consists of 8 bits). These three samples are fed to the second-order difference calculator which is consists of an adder 5 and a subtractor 6. An adder 5 adds the values of $X(k-1)/2$ and $X(k+1)/2$, and an output from the adder 5 is fed to a subtractor 6 through a register R4. The subtractor 6 is supplied with a value twice a sample $X(k)$ of the current bit. An output of the subtractor 6 is applied to a register R5.

Therefore, the following appear at the output of the register R5:

$$Y(k)=2\times X(k)-X(k-1)/2-X(k+1)/2.$$

A predetermined threshold value integral detecting method is produced by a switch 7. Amplitude $X(k+1)$ of the subsequent bit undergoes subtraction with the threshold value T in a subtractor 8. MSB of the output from the subtractor 8 is entered in a register R7 via an invertor 9. The provisional identifying value $A'(k+1)$ for the subsequent bit is obtained from the register R7.

An output $Y(k)$ from the register R5 and the threshold value T are supplied to a subtractor 10 which applies it output to a register R6. An output from the register R6 $(Y(k)-T)$ is given to an adder 11. The adder 11 is fed with one of the second-order threshold values D and S selected by a multiplexer 12. A discriminating signal DS for controlling the multiplexer 12 is produced by an EX-OR (exclusive logical sum) gate 13.

Applied to the EX-OR gate 13 are the provisional identifying value $A'(k+1)$ and the identifying value $A(k-1)$ of a preceding bit. Therefore, DS=0 if both coincide, and DS=1 if both are different. When DS=0, the multiplexer 12 selectively gives the threshold value S to the adder 11. When DS=1, the multiplexer 12 selectively gives the threshold value D to the adder 11. The adder 11, in response to $A(k-1)$, executes one of addition or subtraction. That is, the adder 11 executes addition if $A(k-1)$ is 1, and subtraction if $A(k-1)$ is $-1$ (or 0).

The adder 11 outputs a result of computation in the form of $Z(k)$. MSB of $Z(k)$ is output as the identifying value $A(k)$ of the current bit through an invertor 14. Obtained from a register R8 coupled to the invertor 14 is the identifying value $A(k-1)$ of the preceding bit.

Figure 9:
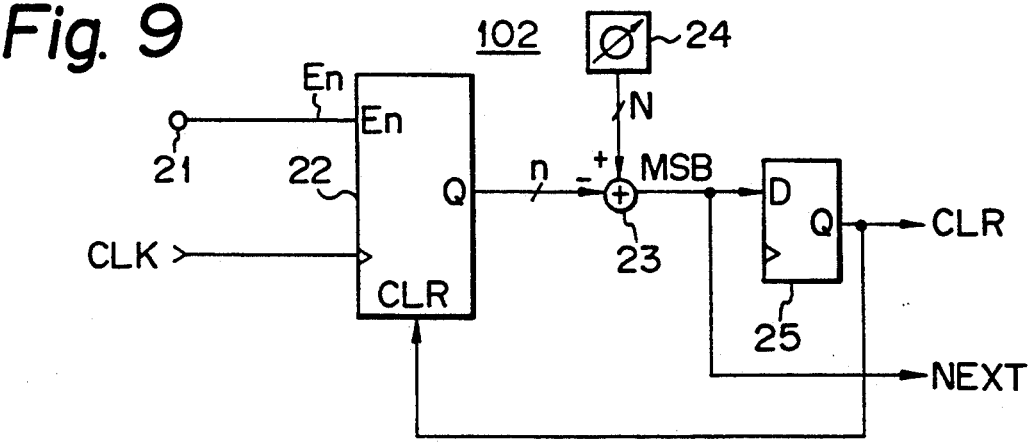
FIG. 9 is a block diagram of a parameter modifying/ controlling circuit in the further embodiment of the invention.

Referring back to FIG. 7, the parameter modifying-/controlling circuit 102 determines the interval for modifying parameters. The circuit 102 may have the arrangement shown in FIG. 9. The parameter modifying/controlling circuit 102 is supplied with an enable signal En from an input terminal 21 together with the clock CLK. The enable signal En and the clock CLK are applied to a counter 22, and its output is applied to a subtractor 23.

The subtractor 23 is supplied with the number of occurrences of addition of equalization errors set by a switch 24. MSB of an output from the subtractor 23 is output as a control signal NEXT and is also output as a clear signal CLR through a register 25. The counter 22 counts the clocks CLK. When the counted value reaches N, MSB of the subtractor 23 is inverted. Then, NEXT is output. One clock later, a clear signal CLR is generated and clears the counter 22. The enable signal En is used not only to prevent modification of the parameters after sufficient convergence or before entry of a reproduced signal but also to prevent that the parameters become abnormal values because of variation in contact and drop out between tape and a head.

Figure 10:
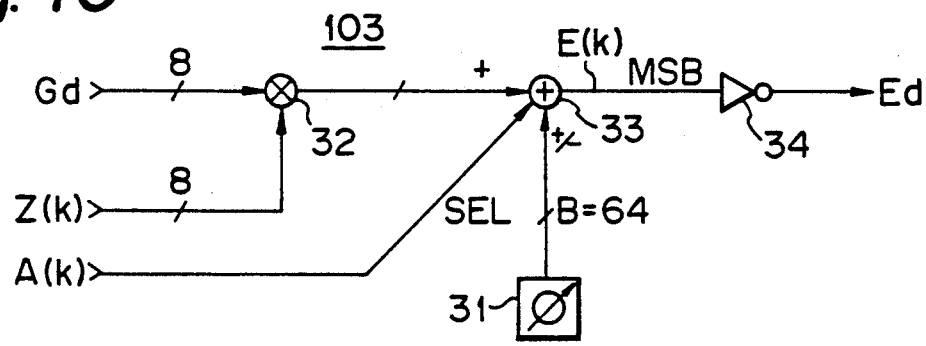
FIG. 10 is a block diagram of an equalization error calculating circuit in the further embodiment of the invention.

The equalization error calculating circuits 103 and 104 have the same arrangement and calculate equalization errors. FIG. 10 shows an example of the equalization error calculating circuit 103. A target value B of the reproduced output is set by a switch 31. A multiplier 32 and a computing circuit 33 generate gain Gd input from the exterior.

$$E(k)=Gd\times Z(k)-B\times(2\times A(k)-1).$$

MSB (sign bit) of an output from the computing circuit 33 is output as Ed through an invertor 34. That is, if $E(k)>0$, Ed=1. If $E(k)<0$, Ed=0. For data A/D-converted in 8 bits, B=64 is optimal.

Figure 11:
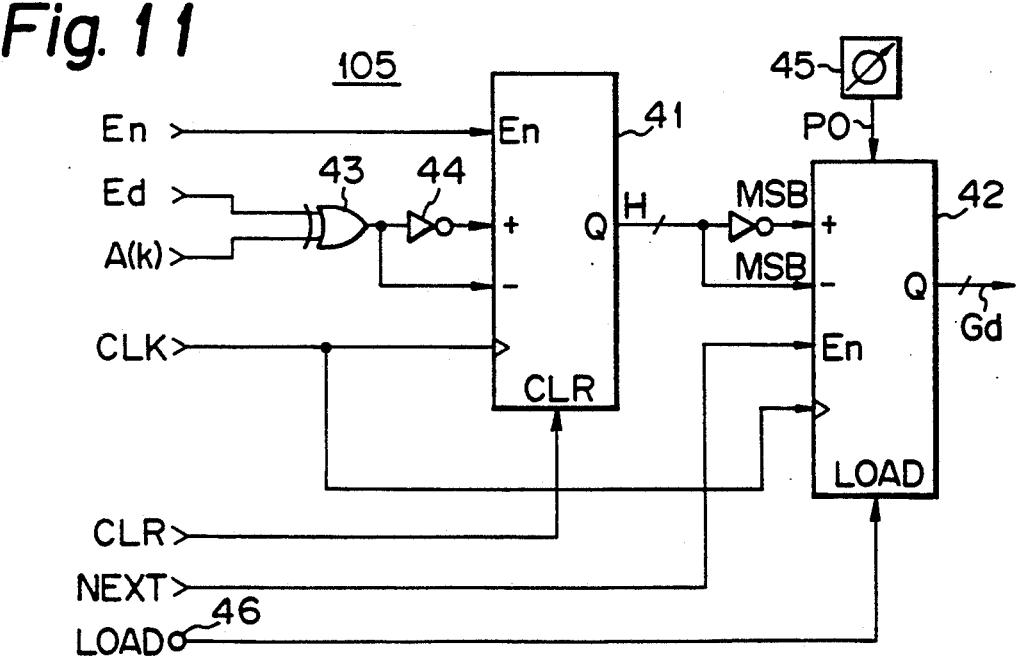
FIG. 11 is a block diagram of a parameter setting circuit in the further embodiment of the invention.
Figure 12B:
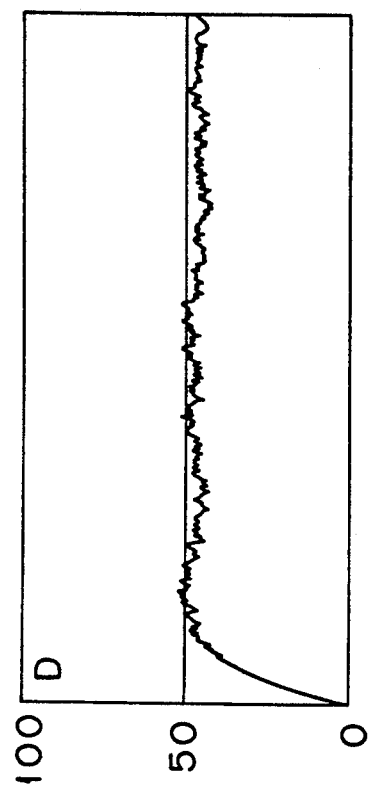
FIG. 12 presents schematic views showing changes in parameters in the further embodiment of the invention.
Figure 12D:
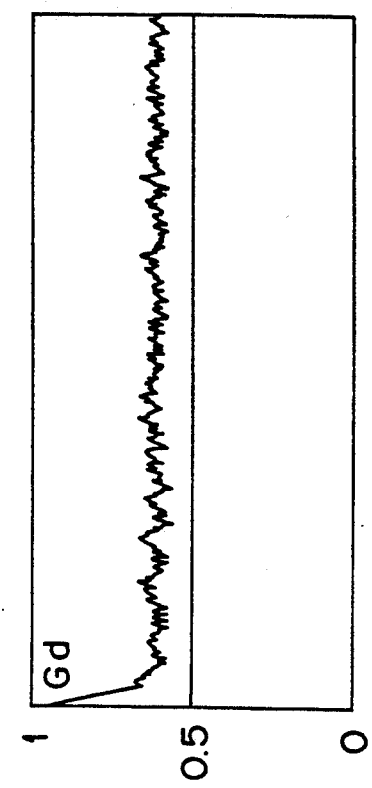
Figure 12A:
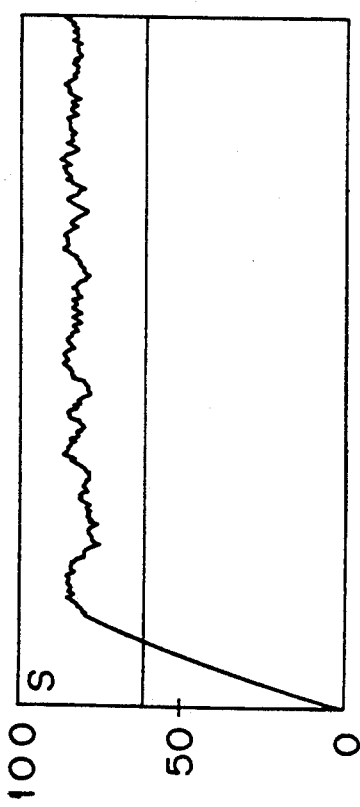
Figure 12C:
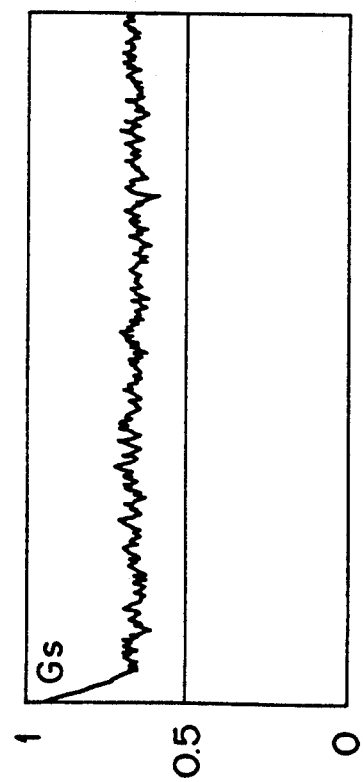
Figure 13B:
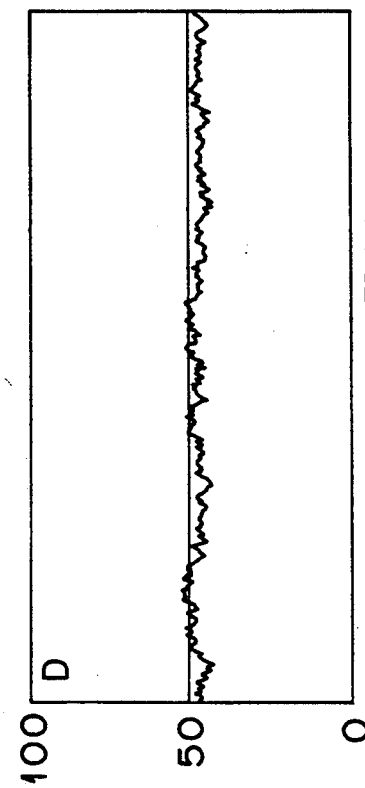
FIG. 13 presents schematic views showing changes in parameters in the further embodiment of the invention.
Figure 13D:
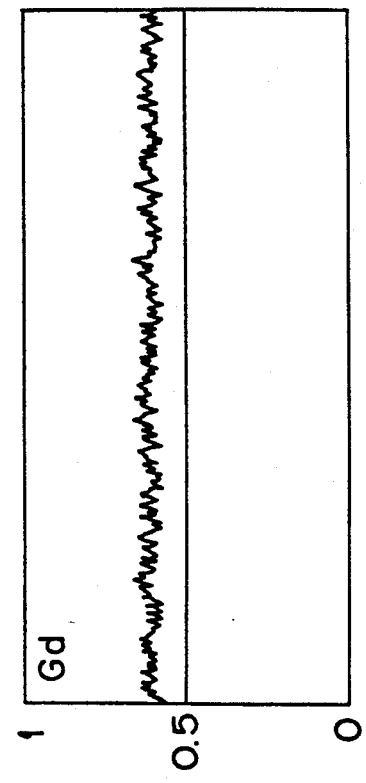
Figure 13A:
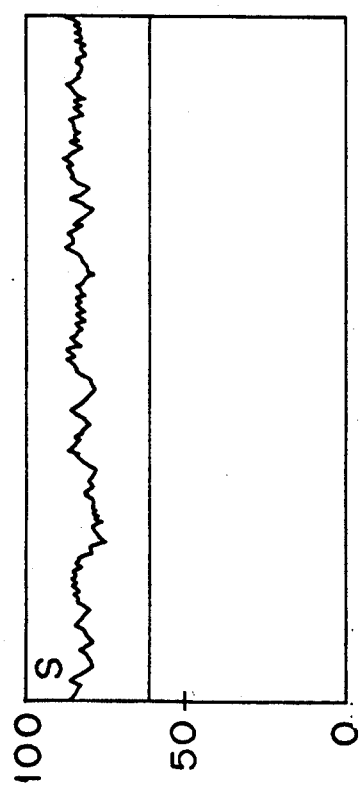
Figure 13C:
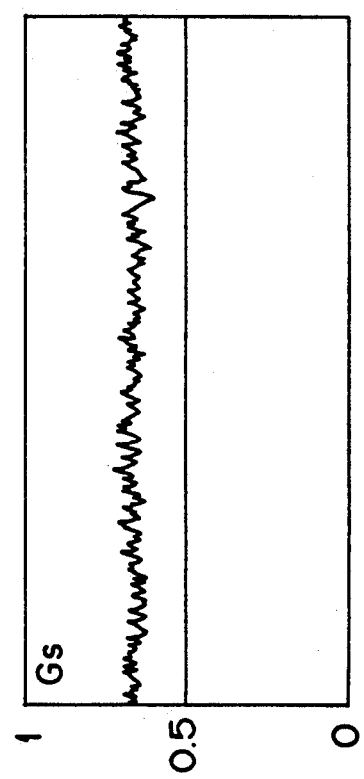

The parameter setting circuits 105, 106, 107 and 108 for setting parameters are used. These circuits have the same arrangement. FIG. 11 shows an example of the parameter setting circuit 105. This circuit includes two up-down counters 41 and 42 as shown in FIG. 11. The counter 41 is used to obtain an equalization error estimating function H. Its counting operation is controlled by the enable signal En, and it is cleared by the clear signal CLR. The enable signal En, as shown in FIG. 7, has been transmitted through an AND gate 109. Other AND gates 110, 111, and 112 are also provided in paths for supplying the enable signal to the other parameter setting circuits 106, 107, and 108. Opening and closing of these AND gates are controlled in response to the discriminating signal DS.

The equalization error Ed and the identification result A(k) are supplied to an EX-OR gate 43. An output from the EX-OR circuit 43 and its inverted version through an invertor 44 are supplied to a counter 41. When the sign of the equalization error Ed coincides with the identification result A(k) and if an output from the EX-OR gate 44 is 0, the counter 41 counts upward. If they are different, the counter 41 counts downward.

The counter 42 is used to set parameters, and reads a present value P0 set by a switch 45 in response to a load signal LOAD from an input terminal 46. After this, every time when the NEXT signal arrives, the counter 46 increases the parameter (Gd) by one step in response to the sign bit (MSB) of H.

In the parameter setting circuit 105, if $Ed \times (2 \times A - 1) > 0$, 1 is added to the output H of the counter 41, and if $Ed \times (2 \times A - 1) < 0$, 1 is deducted from the output H of the counter 41. When the NEXT signal is fed as an enable signal, 1 is added to the output P of the counter 42 if $H < 0$, and 1 is deducted from the output P of the counter 42 if $H > 0$. The output H of the counter 41 is cleared into 0 by the clear signal CLR.

Next, explanation is directed to FIG. 7 which is a block diagram of the entirety combining the circuits referred to above. The reproduced signal from the input terminal 1 is input to the detecting circuit 101, and its outputs $A(k)$, $A(k-1)$, $Z(k)$ and DS are distributed to respective circuit elements. Calculation of the equalization error and setting of the parameters are executed separately in response to the discriminating signal DS, that is, separate consideration is required between consistency and inconsistency of the preceding and subsequent bits are.

When the preceding and subsequent bits are different, the parameter setting circuit 105 sets the gain Gd and inputs it to the equalization error calculating circuit 103. At the same time, the parameter setting circuit 106 sets the second-order difference threshold value D and inputs it to the detecting circuit 101. When the preceding and subsequent bits are equal, the parameter setting circuit 107 sets the gain Gs and inputs it to the equalization error calculating circuit 104. At the same time, the parameter setting circuit 108 sets the second-order threshold value S and inputs it to the detecting circuit 101. The parameter modifying/controlling circuit 102 controls a counter in the parameter setting circuit, and performs modification of the parameter and clearance of the counter.

In order to confirm the effect of the parameter automatic setting method according to the further embodiment of the invention, the reproduced signal is AD-converted in 8 bits, entered in the computer, and simulated. Its result is shown in FIG. 12. In this trial, the number of occurrences of addition is N, and the other parameters are set to values shown below. These numerical values are only examples. In practice, the parameters are determined in accordance with the S/N ratio and the converging status of the reproduced signal.

$g = 1/64$
$T = 133$
$S = 0$ (initial value)
$D = 0$ (initial value)
$Gs = 1$ (initial value)
$Gd = 1$ (initial value)

FIG. 12 shows the aspect of changes in parameters started from the initial values and on the way of convergence. FIG. 13 shows changes in parameters after convergence by inputting parameters resulting from convergence as initial values. It is known from FIGS. 12 and 13 that the parameters of the adaptive threshold value detecting method are actually converged by the further embodiment of the invention. When a result obtained from setting the parameters to minimize errors is compared with a result obtained from setting them automatically, the number of errors may be more in the automatic setting. However, in view of a great improvement as compared to the error rate of the existing integral detecting method, the further embodiment copes with variations and changes with time between tape and a head by setting the parameters automatically. Therefore, from the long-span view, the error rate is smaller in automatic setting than a long-time use of parameters manually set to minimize errors.

The invention provides the effects indicated below as compared to the existing method which, compares a reproduced signal after equalization with a predetermined threshold value and converts the reproduced signal into a binary signal:

Errors can be reduced even upon a distortion caused by low range shutoff, high range shortage and bit shift. Also, errors by a random noise can be reduced.

A noise is never stressed.

Erroneous transfer does not occur.

A simple circuit may be realized.

Further, since automatic adjustment of parameters is executed, automatic adjustment of parameters is possible without using a test signal, and variations and changes with time of devices and media can be compensated.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A bit detecting process for identifying binary bit values of digitized signals whose bit amplitudes may be distorted, said process comprising the steps of:

generating a digital signal representing the amplitude of a bit at discrete clock intervals;

determining a difference between a threshold value and the value of said digital signal;

providing a first integral method algorithm for identifying the binary value of said bit;

providing a second second-order difference method algorithm for identifying the binary value of said bit; and selecting either said first integral method algorithm or said second second-order difference method algorithm as a function of said determined difference, thereby identifying the binary value of said bit.

2. The process of claim 1 wherein said step of providing a second second-order difference method algorithm includes the steps of:

shifting said digital signal to generate shifted digital signals representing different bit amplitude data at discrete clock intervals; and combining selected ones of said shifted digital signals to compute a value to be compared with a second-order difference threshold.

3. The process of claim 1, wherein the threshold value used to determine a difference is an integral detecting threshold value.

4. The process of claim 2, wherein said shifted digital signals comprise a current digital signal representing the bit amplitude of said digital signal at a current clock interval, a first preceding digital signal representing the bit amplitude of said digital signal at a first preceding clock interval and a second preceding digital signal representing the bit amplitude of said digital signal at a second preceding clock interval.

5. The process of claim 4, wherein said step of selecting selects either said first integral method algorithm if said difference between said first preceding digital signal and said integral detecting threshold value is greater than a reference value or said second second-order difference method algorithm if said difference between the value of said first preceding digital signal and said integral detecting threshold value is less than or equal to said reference value.

6. A bit detecting apparatus for identifying binary bit values of digitized signals whose bit amplitudes may be distorted, said apparatus comprising:

generating means for generating a digital signal representing the amplitude of a bit at discrete clock intervals;

determining means for determining a difference between a threshold value and the value of said digital signal;

first providing means for providing an integral method algorithm for identifying the binary value of said bit;

second providing means for providing a second-order difference method algorithm for identifying the binary value of said bit; and selecting means for selecting either said first providing means or said second providing means as a function of said determined difference to provide the algorithm for identifying the binary value of said bit.

7. The apparatus of claim 6 wherein said second providing means comprises:

shifting means for shifting said digital signal to generate shifted digital signals representing different bit amplitude data at discrete clock intervals; and combining means for combining selected ones of said shifted digital signals to compute a value to be compared with a second-order difference threshold.

8. The apparatus of claim 6, wherein said determining means includes means for supplying an integral detecting threshold value as said threshold value.

9. The apparatus of claim 7, wherein said shifting means is operative to produce a current digital signal representing the bit amplitude of said digital signal at a current clock interval, a first preceding digital signal representing the bit amplitude of said digital signal at a first preceding clock interval and a second preceding digital signal representing the bit amplitude of said digital signal at a second preceding clock interval.

10. The apparatus of claim 9, wherein said selecting means selects either said integral method algorithm if said difference between the value of said first preceding digital signal and said integral detecting threshold value is greater than a reference value or said second-order difference method algorithm if said difference between the value of said first preceding digital signal and said integral detecting threshold value is less than or equal to said reference value.

* * * * *